(12) United States Patent
Nielsen

(10) Patent No.: US 9,500,246 B2
(45) Date of Patent: Nov. 22, 2016

(54) DEVICE FOR STUBBLE TREATMENT AND A VIBRATION-ABSORBING ARRANGEMENT THEREOF

(71) Applicant: DAL-BO A/S, Randbøl (DK)

(72) Inventor: Richard Fabrin Nielsen, Vamdrup (DK)

(73) Assignee: DAL-BO A/S, Randbol (DK)

( * ) Notice: Subject to any disclaimer, the term of this patent is extended or adjusted under 35 U.S.C. 154(b) by 0 days.

(21) Appl. No.: 14/646,913

(22) PCT Filed: Nov. 4, 2013

(86) PCT No.: PCT/DK2013/050354
§ 371 (c)(1),
(2) Date: May 22, 2015

(87) PCT Pub. No.: WO2014/079449
PCT Pub. Date: May 30, 2014

(65) Prior Publication Data
US 2015/0292591 A1    Oct. 15, 2015

(30) Foreign Application Priority Data
Nov. 26, 2012 (DK) .................................. 2012 70733

(51) Int. Cl.
*F16F 7/08* (2006.01)
*A01B 29/06* (2006.01)
*A01D 34/835* (2006.01)
*A01D 67/00* (2006.01)

(52) U.S. Cl.
CPC ............... *F16F 7/087* (2013.01); *A01B 29/06* (2013.01); *A01D 34/8355* (2013.01); *A01D 67/00* (2013.01)

(58) Field of Classification Search
CPC .. A01B 21/08; A01B 21/083; A01B 21/086; A01B 29/00–29/06; A01D 67/00; A01D 34/8355; F16F 7/087
See application file for complete search history.

(56) References Cited

U.S. PATENT DOCUMENTS

| 1,397,391 | A |   | 11/1921 | Adams |
| 1,429,163 | A | * | 9/1922  | Peden ................ A01D 34/8355 172/551 |
| 1,490,222 | A | * | 4/1924  | Martin ................ A01B 29/045 172/551 |
| 1,650,472 | A | * | 11/1927 | Smith ................ A01D 34/8355 172/500 |
| 2,308,281 | A |   | 1/1943  | Green |
| 2,322,076 | A | * | 6/1943  | Watson .............. A01D 34/8355 172/500 |

(Continued)

FOREIGN PATENT DOCUMENTS

EP           0 045 060 A1    2/1982

*Primary Examiner* — Robert Pezzuto
*Assistant Examiner* — Adam Behrens
(74) *Attorney, Agent, or Firm* — David S. Safran

(57) ABSTRACT

A device for stubble treatment once a crop has been harvested having a frame, at least one knife rolling segment connectable to the frame through a pair of bearings to operate substantially horizontally, a vibration-absorbing arrangement for each bearing that is adapted to be mounted between a bearing and a free-end of the frame that has vibration-absorbing elements that are at least partially made of a resilient material to isolate the frame from vibrations generated at the rolling segment, a first plate to be attached to the free-end of the frame and a second plate adapted to be attached to the bearing, the plates being adapted to be fastened together. Two or more vibration-absorbing elements are positioned in-between the plates, wherein two vibration-absorbing elements are positioned symmetrically with respect to the center of the plates.

4 Claims, 3 Drawing Sheets

(56) References Cited

U.S. PATENT DOCUMENTS

| | | | | |
|---|---|---|---|---|
| 2,422,409 | A * | 6/1947 | Greenroyd | A01D 34/8355 172/551 |
| 2,896,937 | A * | 7/1959 | Miller | F16F 3/10 188/129 |
| 4,066,132 | A * | 1/1978 | Rehn | A01B 61/04 172/572 |
| 4,223,742 | A | 9/1980 | Stark | |
| 4,407,372 | A * | 10/1983 | Rozeboom | A01B 61/04 172/572 |
| 4,418,761 | A | 12/1983 | Dietrich, Sr. et al. | |
| 4,972,664 | A * | 11/1990 | Frey | A01D 67/00 56/13.6 |
| 5,042,590 | A * | 8/1991 | Bierl | A01B 21/08 172/572 |
| 5,279,236 | A * | 1/1994 | Truax | A01B 21/086 111/139 |
| 5,538,086 | A * | 7/1996 | Wright | A01B 59/004 172/272 |
| 5,725,057 | A * | 3/1998 | Taylor | A01B 29/04 172/121 |
| 5,785,129 | A * | 7/1998 | Keller | A01B 39/08 172/536 |
| 6,158,523 | A * | 12/2000 | Gengler | A01B 15/18 172/572 |
| 6,457,903 | B1 * | 10/2002 | Dufty | A01B 29/06 172/118 |
| 6,676,101 | B2 * | 1/2004 | Platus | F16F 15/02 248/566 |
| 7,131,501 | B1 * | 11/2006 | Svendsen | A01B 23/046 172/601 |
| 7,175,150 | B2 * | 2/2007 | Chi | F16F 3/10 248/562 |
| 7,743,844 | B2 * | 6/2010 | Kovach | A01B 23/046 172/261 |
| 7,837,169 | B2 * | 11/2010 | Denis | A01B 33/08 248/316.8 |
| 7,987,917 | B1 * | 8/2011 | Kornecki | A01B 29/02 172/184 |
| 8,365,837 | B2 * | 2/2013 | Gray | A01B 21/086 172/265 |
| 8,413,739 | B2 * | 4/2013 | Casper | A01B 21/083 172/572 |
| 9,155,240 | B2 * | 10/2015 | Redekop | A01B 73/044 |
| 2002/0112461 | A1 * | 8/2002 | Burk | A01D 34/8355 56/504 |
| 2004/0149186 | A1 * | 8/2004 | Stark | A01B 21/086 111/25 |
| 2008/0143029 | A1 * | 6/2008 | Sato | F16F 1/38 267/141.1 |
| 2009/0090523 | A1 * | 4/2009 | Newman | A01B 61/04 172/570 |
| 2011/0132627 | A1 * | 6/2011 | Gray | A01B 21/086 172/265 |
| 2011/0179758 | A1 * | 7/2011 | Kitchel | A01D 45/02 56/52 |
| 2014/0191104 | A1 * | 7/2014 | Meisel | E04H 9/021 248/624 |
| 2014/0290545 | A1 * | 10/2014 | Van Buskirk | A01B 63/32 111/14 |

* cited by examiner

DEVICE FOR STUBBLE TREATMENT AND A VIBRATION-ABSORBING ARRANGEMENT THEREOF

BACKGROUND OF THE INVENTION

Field of the Invention

The invention relates to a device for stubble treatment once a crop has been harvested, which device comprises a frame, wherein at least one knife rolling segment is adapted to be coupled to said frame through a pair of bearings and to operate substantially horizontally, said device further comprises a vibration-absorbing arrangement for each bearing, which vibration-absorbing arrangement is adapted to be mounted between a bearing and a free-end of said frame, wherein said vibration-absorbing arrangement is at least partially made of a resilient material, wherein said vibration-absorbing arrangement is adapted to isolate the frame from vibrations generated at the rolling segment and propagated to each bearing, wherein said vibration-absorbing arrangement comprises a first plate and a second plate, said first plate being adapted to be attached to the free-end of said frame and said second plate being adapted to be attached to said bearing, said plates being adapted to be fastened together, wherein one or more vibration-absorbing elements are positioned in-between said plates.

Also, the invention relates to a vibration-absorbing arrangement adapted to be mounted to a device as described above, which vibration-absorbing arrangement is adapted to be mounted to said device between a bearing and a free-end of said frame.

Description of Related Art

A device for stubble treatment can be used for many types of residual plant matters such as sunflower, maize, rape, vegetables, tobacco and cotton. In order to achieve optimal cutting/comminuting of plant material, it is important that the blades of the knife rolling segments are mounted perpendicularly to the operational direction of the device such that an entire blade strikes into the ground at once. This impact provides critical vibrations, which are transmitted to the chassis frame. Due to the high speed at which the machine is driven for efficiently cutting stubbles (e.g., 25 km/h) and consequently the high frequency at which the roller works (e.g., 30 Hz), cracks easily form in the steel structure of the frame, thus the device gets quickly damaged. If the knives are mounted differently, the shredding of plant material is significantly less effective, because said "strike" does not take place, and the roller segments simply roll over the plant material. Thus, mounting of the blades slightly obliquely to the operational direction of the device is not an efficient solution to the vibration problem. Consequently, an alternative solution is to mitigate the effect of the vibrations by reinforcing the most sensitive parts of the construction. Nevertheless, cracks will sooner or later also form in the other parts which have not been reinforced beforehand. Hence, this is not a durable and economic solution.

U.S. Pat. No. 4,407,372 illustrates a vibration-damping arrangement formed of two C-shaped springs positioned in-between the frame and each of the bearings used for mounting the shaft of a harrow. The arrangement provides graduated resilience at low impact loads by a first C-shaped spring and increased resilience at high impact loads by an additional C-shaped spring nested within the first C-shaped spring. Although damped, vibrations will still affect the frame, which will eventually experience cracks. Moreover, due to high impact loads and/or with time, the springs will get permanently deformed, thus stopping performing optimally and providing the desired damping effect.

U.S. Pat. No. 4,223,742 discloses a roller for cultivating or rolling soil. The roller consists of several hinged, interconnected frame sections, each comprising a set of rolls mounted on a common shaft rotatably attached at the free-end of downwardly extending arms. The arms are pivotally and resiliently mounted on the frame. Additionally, the arms are slightly rotatable or twistable about their longitudinal axis thanks to a rubber cushion positioned between the arm and the bearing of the shaft. However, due to vibrations, the rubber cushion may break, which results in the arm getting detached from the shaft.

Hence, there is a need in the technical field of devices for stubble treatment and related vibration-absorbing arrangements of overcoming the aforementioned drawbacks of the state-of-the-art solutions.

SUMMARY OF THE INVENTION

The first object of the invention is to provide an improvement to the state of the art. The second object of the invention is to solve the aforementioned drawbacks of the prior art. The third object of the invention is to alleviate the problems caused by the use of a knife rolling segment operated at high speed, such as preventing the formation of cracks and avoiding the need of applying reinforcements to the construction.

The aforementioned objects of the invention are achieved by a device for stubble treatment as described herein, wherein two vibration-absorbing elements are positioned symmetrically with respect to the center of the plates. It is noted that the vibration-absorbing arrangement may also be positioned at a free-end of a bracket attached to the frame.

The invention has the advantage that vibrations (e.g., at frequencies in the range between 15 and 40 Hz) propagating from the knife rolling segment to the frame of the device are absorbed, thus no cracks form in the structure and no/less reinforcements are to be applied to the frame. For example, vibrations at around 30 Hz may cause problems to the durability of the chassis frame, as some of the frame's own resonance frequencies are hit. Therefore, the invention leads to a more durable and economic solution.

Advantageously, the first plate and the second plate may be metal plates. Moreover, the vibration-absorbing arrangement may be placed closer to the frame or closer to the bearing. Also, two vibration-absorbing arrangements, one positioned closer to the bearing and another one positioned closer to the frame may be envisioned. Finally, the width of the plate may vary depending on the available space between the frame and the knife rolling segment. An advantage of these examples is that the bearing can work at a certain vibration frequency without propagating the vibrations further to the frame (or the bracket).

Herein "knife rolling segment" is defined as a unit comprising an axle mounted perpendicularly to the operational direction of the device (i.e., the direction of travel) and a number of axial or mainly axial-extending knives, which are arranged regularly-spaced at the periphery of a central roller body.

Herein "substantially horizontal" refers to the axle of the one or more rolling segments (it may also be a common axle) lying on a plane that may deviate from a horizontal plane by a few degrees (e.g., 10°) when in operation, i.e., the extremities of the axle may be tilted off by a few degrees upwards/downwards with respect to the center of the axle.

In an embodiment of the invention, said second plate has a through hole for each vibration-absorbing element, wherein each vibration-absorbing element is formed such that a first portion of each vibration-absorbing element is positioned in-between said plates, a second portion of each vibration-absorbing element is accommodated into said through hole and a third portion of each vibration-absorbing element is fastened underneath said second plate. An advantage of this embodiment is that the frame (or the bracket) and the bearing can be firmly attached to each other, for example, through one or more bolts (e.g., 2).

In an embodiment of the invention, said vibration-absorbing arrangement further comprises a third plate for each vibration-absorbing element, each third plate being positioned in-between the first plate and the second plate and having a through hole such that the second portion of each vibration-absorbing element is accommodated into said through hole, said third plate being adapted to be fastened to said second plate. Advantageously, the third plate is fastened to the second plate by means of one or more bolts (e.g., 4). Advantageously, a third plate may be produced as an integral part of a vibration-absorbing element. An advantage of this embodiment is the capability to better withstand vibrations due to the horizontal load, in addition to vibrations due to the vertical load.

In an embodiment of the invention, said one or more vibration-absorbing elements comprise a resilient material. Advantageously, said resilient material may be an elastomer such as rubber, vulcanized rubber, silicone, and any other suitable material having resilient properties, and combinations thereof. An advantage of this embodiment is that such materials are able to absorb vibrations in the aforementioned interval, which leads to a significant reduction/the elimination of vibrations in the frame.

In an embodiment of the invention, said one or more vibration-absorbing elements are springs, air cushions, and any other suitable item having resilient properties, and combinations thereof. An advantage of this embodiment is to provide alternative or complementary vibration-absorbing elements.

Also, the aforementioned objects of the invention are achieved by a vibration-absorbing arrangement adapted to be mounted to a device for stubble treatment once a crop has been harvested, which device comprises a frame, wherein at least one knife rolling segment is adapted to be coupled to said frame through a pair of bearings and to operate substantially horizontally, which vibration-absorbing arrangement is adapted to be mounted to said device between a bearing and a free-end of said frame, wherein said vibration-absorbing arrangement is at least partially made of a resilient material, wherein said vibration-absorbing arrangement is adapted to isolate the frame from vibrations generated at the rolling segment and propagated to the bearing, wherein said vibration-absorbing arrangement comprises at least a first plate and a second plate, said first plate being adapted to be attached to the free-end of said frame and said second plate being adapted to be attached to said bearing, said plates being adapted to be fastened together, wherein one or more vibration-absorbing elements are positioned in-between said plates, wherein two vibration-absorbing elements are positioned symmetrically with respect to the center of the plates.

Advantageously, the second plate has a through hole for each vibration-absorbing element, wherein each vibration-absorbing element is formed such that a first portion of each vibration-absorbing element is positioned in-between said plates, a second portion of each vibration-absorbing element is accommodated into said through hole and a third portion of each vibration-absorbing element is fastened underneath said second plate.

Advantageously, the vibration-absorbing arrangement further comprises a third plate for each vibration-absorbing element, each third plate being positioned in-between the first plate and the second plate and having a through hole such that the second portion of each vibration-absorbing element is accommodated into the through hole, the third plate being adapted to be fastened to the second plate.

Advantageously, the one or more vibration-absorbing elements comprise a resilient material.

Advantageously, the one or more vibration-absorbing elements are springs, air cushions, and combinations thereof.

Hereafter, the invention will be described in connection with accompanying drawings illustrating non-limiting examples of a device for stubble treatment and a vibration-absorbing arrangement thereof.

DETAILED DESCRIPTION OF THE INVENTION

Figure 1:
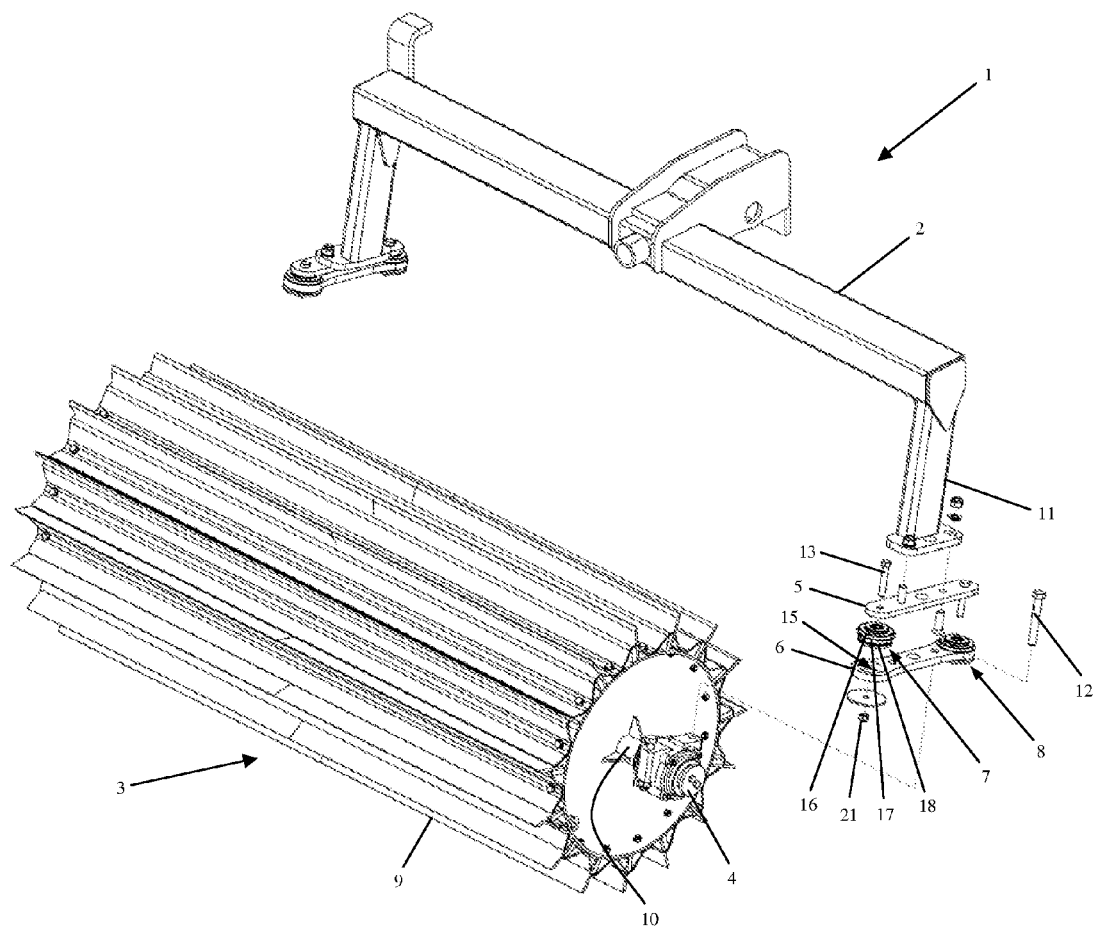
FIG. 1 is an exploded view showing the various elements of a device for stubble treatment in accordance with the invention.

FIG. 1 shows the different elements of a device 1 for stubble treatment according to the invention and an exemplary method for assembling them together. A roller segment 3 is provided with blades 9 and is connected to a bearing 4 through its axel 10. A frame 2 has a bracket 11 attached to its free-ends. The first plate 5 is attached at the free-end of the bracket 11 and the second plate 6 is attached at the top part of the bearing 4 (plates 5, 6 could also respectively be integrated in the bracket 11 and in the bearing 4). Two vibration-absorbing elements 7, 8 are interposed in-between the two plates 5, 6. The second plate 6 presents a through hole 15 per each vibration-absorbing element 7, 8 for accommodating a second portion 17 of each vibration-absorbing element 7, 8. Bolts 12, 13 and nuts 21, 22 are used to assemble the vibration-absorbing arrangement 14 together by fastening together the two plates 5, 6.

Figure 2:
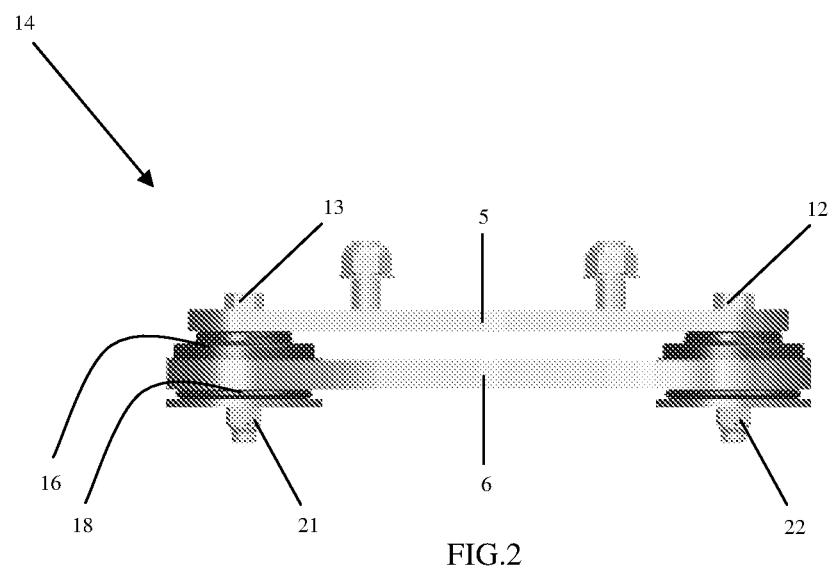
FIG. 2 is a side view of a vibration-absorbing arrangement of the FIG. 1 device.

FIG. 2 shows a close-up view of the vibration-absorbing arrangement 14 illustrated in FIG. 1.

Figure 3:
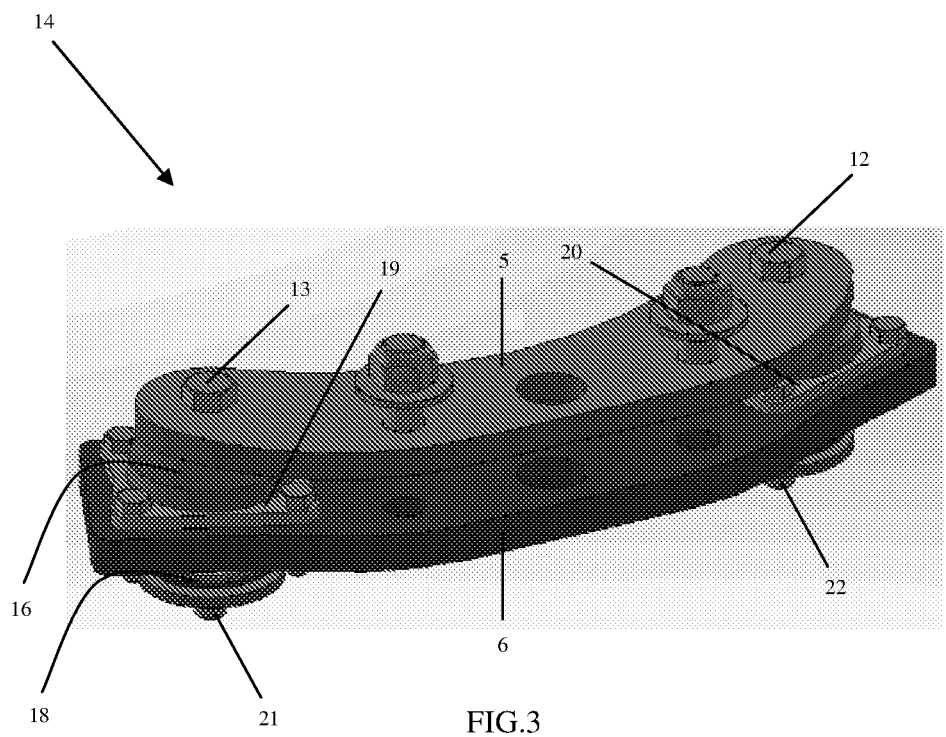
FIG. 3 is perspective view of a modified vibration-absorbing arrangement having two third plates.

FIG. 3 shows a close-up view of a vibration-absorbing arrangement 14 comprising two third plates 19, 20, each third plate 19, 20 accommodating the second portion 17 (not visible in FIG. 3) of a vibration-absorbing element 7, 8 and being fastened to the second plate 6 by means of four bolts and nuts.

What is claimed is:

1. A device for stubble treatment once a crop has been harvested, comprising:
    a frame,
    a pair of bearings,
    at least one knife rolling segment adapted to be coupled to said frame by said bearings so as to operate substantially horizontally, and a vibration-absorbing arrangement for each bearing which is adapted to be mounted between a bearing and an end of said frame, wherein said vibration-absorbing arrangement has at least two vibration-absorbing elements and is at least partially made of a resilient material adapted to isolate the frame from vibrations generated at the at least one rolling segment and propagated to each bearing, wherein said vibration-absorbing arrangement further comprises a first plate and a second plate, said first plate being adapted to be attached to the free-end of said frame and said second plate being adapted to be attached to a respective said bearing, said plates being adapted to be fastened together, wherein two said at least two vibration-absorbing elements are positioned in-between said plates symmetrically with respect to the center of the plates, and wherein said second plate has a through hole for each vibration-absorbing element, wherein each vibration-absorbing element has a first portion positioned in-between said plates, a second portion accommodated in said through hole and a third portion fastened underneath said second plate, and wherein said vibration-absorbing arrangement further comprises a third plate for each vibration-absorbing element, each third plate being positioned in-between the first plate and the second plate and having a through hole in which the second portion of each vibration-absorbing element is accommodated, said third plate being adapted to be fastened to said second plate.

2. The device according to claim 1, wherein said vibration-absorbing elements comprise a resilient material.

3. The device according to claim 1, wherein said vibration-absorbing elements are at least one of springs, air cushions, and combinations thereof.

4. A vibration-absorbing arrangement adapted to be mounted to a device for stubble treatment once a crop has been harvested having a frame, a pair of bearings, at least one knife rolling segment adapted to be coupled to said frame by said bearings so as to operate substantially horizontally, the vibration-absorbing arrangement being adapted to be mounted to said device between a bearing and an end of said frame and the vibration-absorbing arrangement comprising:

at least two vibration-absorbing elements at least partially made of a resilient material so as to isolate the frame from vibrations generated at the at least one rolling segment and propagated to each bearing, and a first plate and a second plate, said first plate being adapted to be attached to the free-end of said frame and said second plate being adapted to be attached to a respective said bearing, said plates being adapted to be fastened together, wherein two said at least two vibration-absorbing elements are positioned in-between said plates symmetrically with respect to the center of the plates, and wherein said second plate has a through hole for each vibration-absorbing element, wherein each vibration-absorbing element has a first portion positioned in-between said plates, a second portion accommodated in said through hole and a third portion fastened underneath said second plate, and wherein said vibration-absorbing arrangement further comprises a third plate for each vibration-absorbing element, each third plate being positioned in-between the first plate and the second plate and having a through hole in which the second portion of each vibration-absorbing element is accommodated, said third plate being adapted to be fastened to said second plate.

* * * * *